INVENTORS
Francis O. Gadd,
Richard H. Sanderson,
Luther N. Kern &
BY Millis V. Parshall

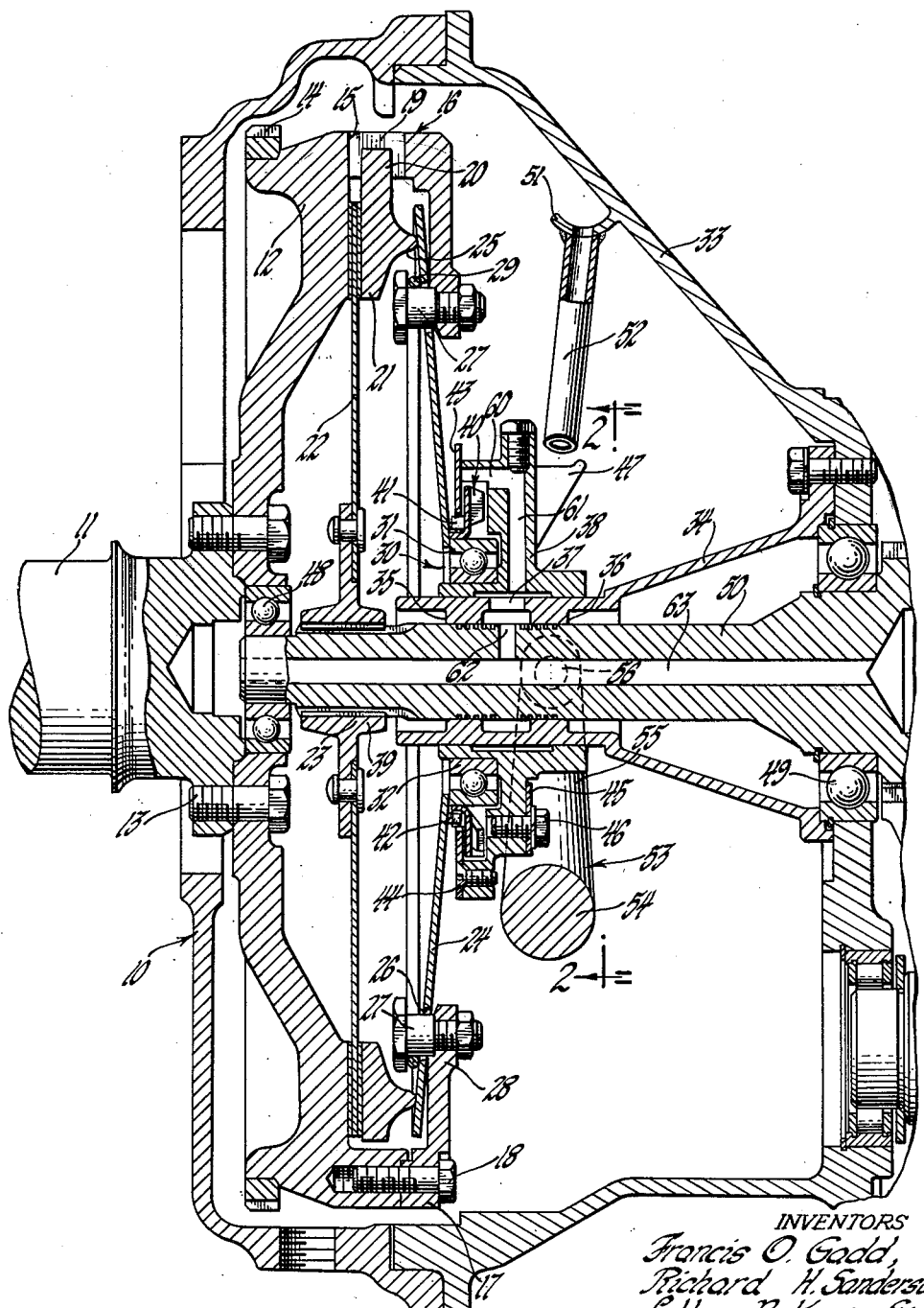

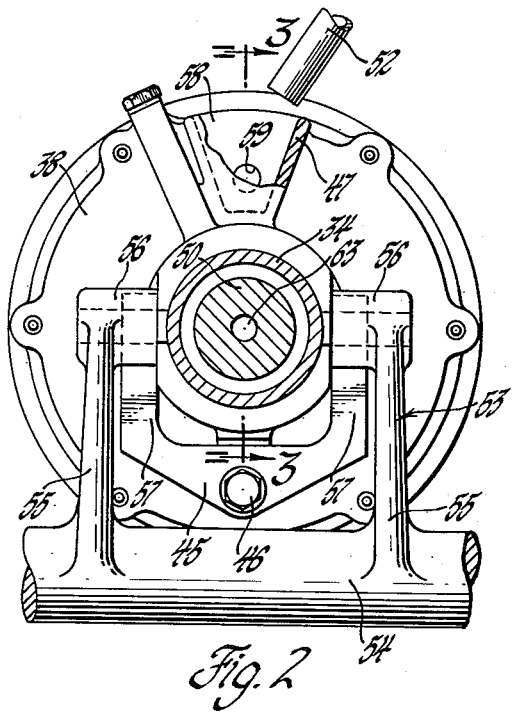

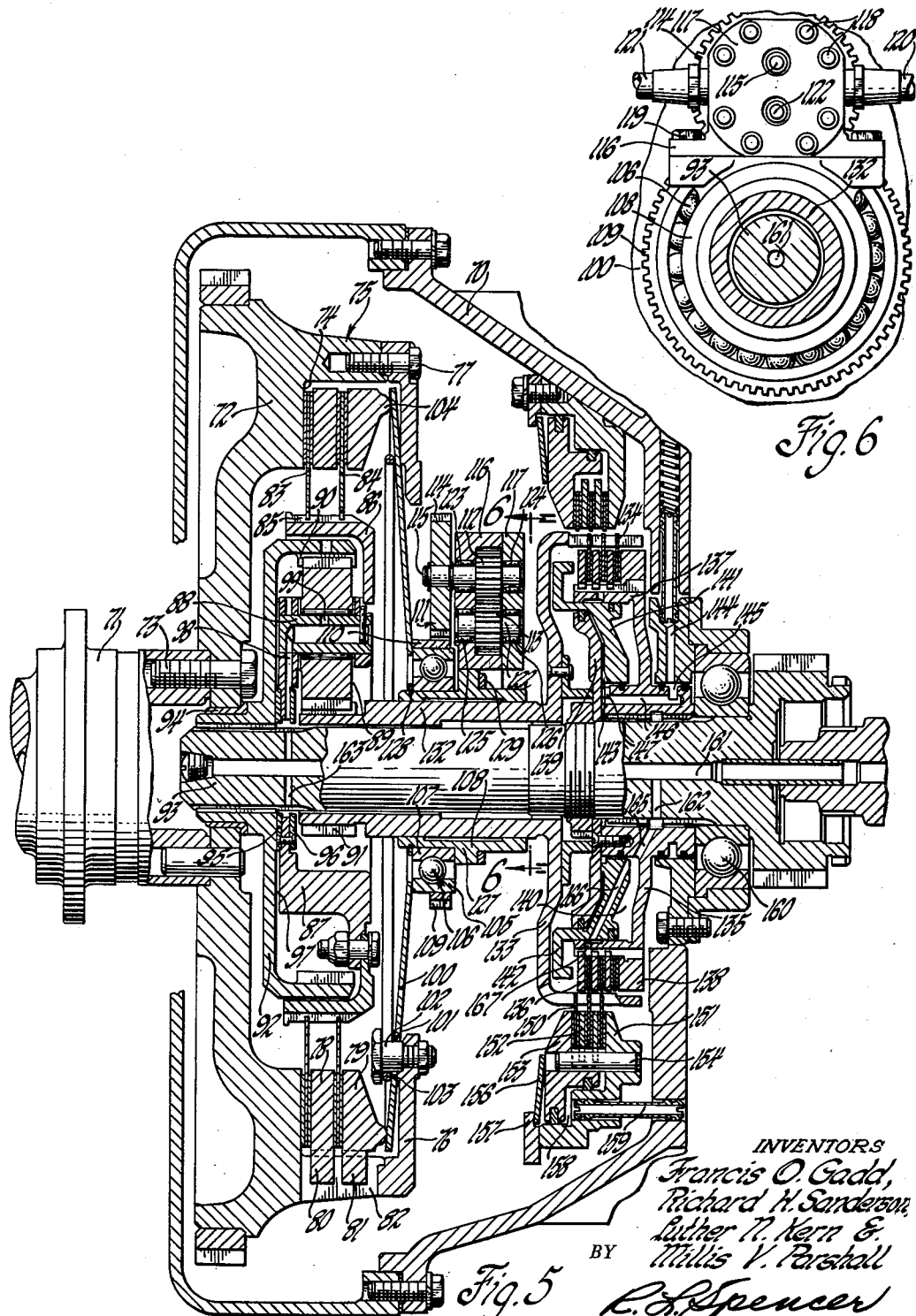

ATTORNEY

United States Patent Office 3,104,746
Patented Sept. 24, 1963

3,104,746
TRANSMISSION CLUTCH CONTROL AND PUMP DRIVE MECHANISM
Francis O. Gadd, Birmingham, Richard H. Sanderson, Clawson, Luther N. Kern, Berkley, and Millis V. Parshall, Pontiac, Mich., assignors to General Motors Corporation, Detroit, Mich., a corporation of Delaware
Filed Aug. 30, 1960, Ser. No. 52,838
12 Claims. (Cl. 192—113)

This invention relates to transmissions and more particularly to a transmission of the type having an engageable and releasable clutch and including a clutch actuating element adapted to continuously drive a pump irrespective of the condition of engagement or release of the clutch.

An object of this invention is to provide an inexpensive and simple pump drive wherein a pump is continuously driven by a clutch control element of a transmission.

Another object of this invention is to provide a transmission incorporating an engageable and releasable clutch and wherein a pump is continuously driven by a clutch control member irrespective of the condition of operation of the clutch.

A further object of this invention is to locate a pump in a clutch housing to permit the use of an inexpensive type pump.

An additional object of this invention is to provide in a transmission of the type having an engageable and releasable clutch and a clutch control member positioned in a clutch housing, a pump located in the clutch housing and continuously driven by the clutch control member irrespective of the condition of engagement or release of the clutch.

A more particular object of this invention is to provide in a transmission of the type having a clutch throw out bearing operable upon a clutch actuating member to control the engagement and release of a clutch, a pump continuously driven by the clutch actuating member irrespective of the position of the clutch throw out bearing in its path of travel.

A further object of this invention is to provide in a transmission of the type having an axially movable clutch throw out bearing for actuating a clutch control member, a pump driven by the clutch control member and axially movable with the clutch throw out bearing.

Another object of this invention is to provide in a transmission of the type incorporating a Belleville spring for engaging and releasing a clutch, a pump continuously driven by the Belleville spring irrespective of the condition of engagement or release of the clutch.

These and other objects and advantages of this invention will be apparent from the following description and claims, taken in conjunction with the accompanying drawings in which:

FIGURE 1 is a sectional view through a clutch housing illustrating a pump driven by a clutch control member.

FIGURE 2 is an end view of the pump assembly of FIGURE 2 illustrating the clutch release fork for axially moving the pump assembly to control the clutch.

FIGURE 3 is a sectional view through the pump housing taken along the line 3—3 of FIGURE 2.

FIGURE 4 is a side view of the pump impeller of FIGURE 1.

FIGURE 5 is a sectional view of a modified form of transmission incorporating a modified form of pump and pump drive from that shown in FIGURE 1.

FIGURE 6 is a sectional view taken along the line 6—6 of FIGURE 5 illustrating the mounting assembly and suction and pressure discharge conduits for the pump.

Figure 7:
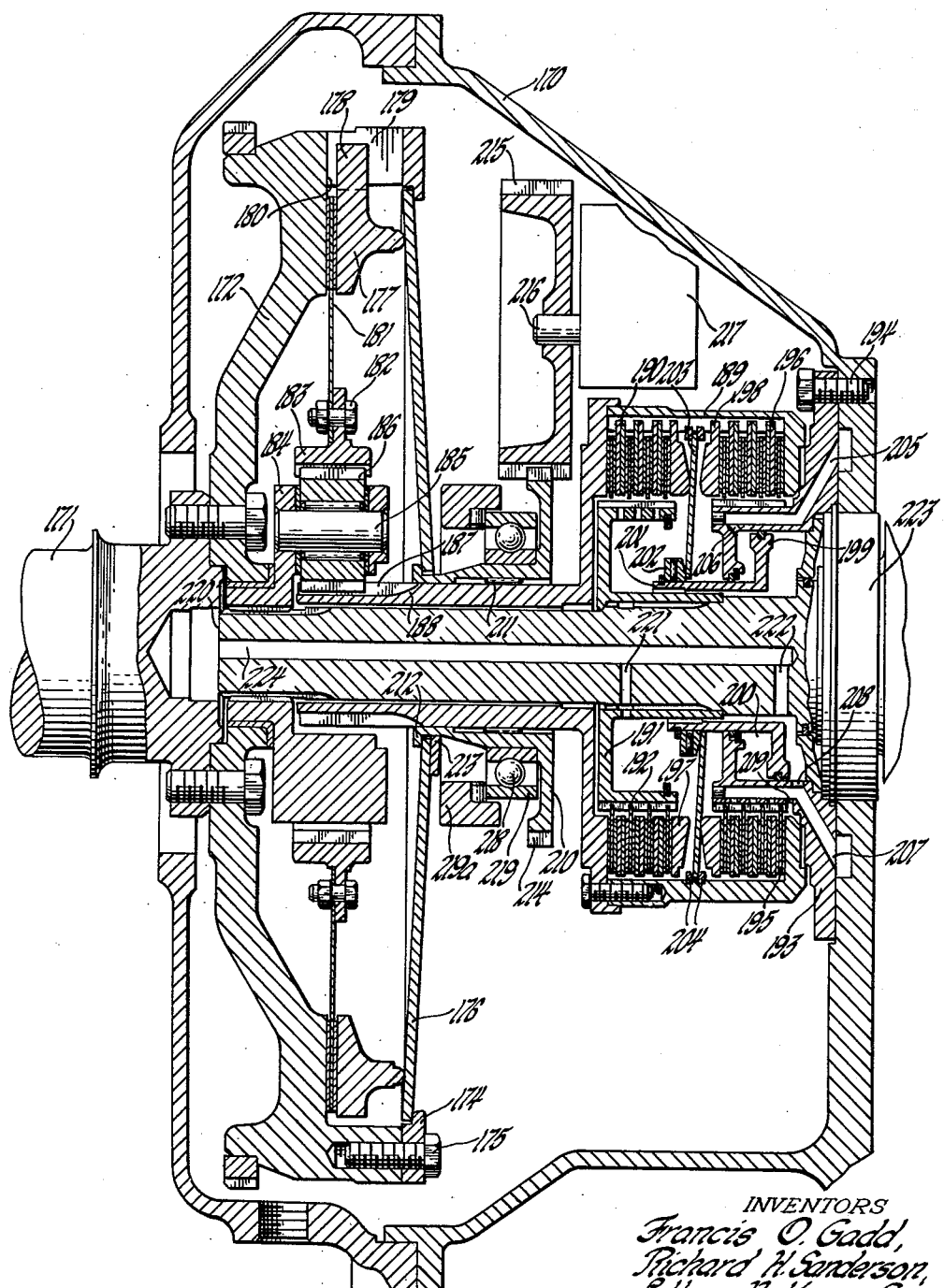
FIGURE 7 is a sectional view of a further modified form of transmission illustrating a further modified form of pump drive.

Referring to FIGURE 1, there is shown a clutch housing 10 enclosing a flywheel 12 driven by an engine driven drive shaft 11, and secured to shaft 11 by means of bolts 13. The flywheel 12 has at its periphery a conventional starting gear 14 and at its rear face a flat annular surface 15 which provides a fixed driving plate for the clutch 16. An annular support 17 is mounted upon flywheel 12 by means of bolts 18. Flywheel 12 is provided with axially extending flat slots 19 adapted to receive radially extending ears 20 on pressure plate 21. Slots 19 and ears 20 cooperate to permit axial motion of pressure plate 21, and provide a driving connection between the flywheel 12 and the pressure plate. A clutch driven plate 22 carried by a hub 23 splined to a driven power delivery shaft 50 extends radially outwardly between surface 15 and pressure plate 21.

The axially movable pressure plate 21 is actuated by an annular spring member or Belleville spring 24 which engages an annular boss 25 on pressure plate 21. Spring 24 has an annular series of apertures 26 for studs 27 which are secured to an inner edge portion 28 of the support member 17. Spring 24 is pivoted between the inner edge of portion 28 and wire rings 29, which are supported on the studs 27. The inner annular edge of Belleville spring 24 engages the outer race 31 of a ball bearing thrust or throw out bearing 30.

A second clutch housing portion 33 fixed to housing portion 10 provides a support for an axially extending annular support member 34, the member 34 contacting the power delivery shaft 50 at 35 and 36 and being drilled at 37 for purposes hereafter explained. Support member 34 supports a pump housing 38 for axial motion with respect to driven shaft 50, the inner race 32 of thrust bearing 30 being supported upon the base 39 of pump housing 38. An impeller 40 supported upon the outer race 31 of bearing 30 is drivingly connected to spring 24 by means of a lug 41 on impeller 40 and a lug 42 formed on spring 24. A housing cover 43 detachably secured to pump housing 38 by a series of screws 44 provides a recess through which the drive lugs 42 may extend into the pump to contact the driven lugs 41 on impeller 40. A clutch release fork plate 45 is secured to pump housing 38 by means of a bolt 46. A trough 47 is formed on the side wall of housing 38 for purposes hereafter more fully explained. Driven shaft 50 is supported for rotation in flywheel 12 by means of a ball bearing 48 and is supported in housing portion 33 by a ball bearing 49. Power delivery shaft 50 may constitute the power input shaft to a transmission (not shown) of any conventional type such as, for example, a manual shift gear box or an automatic transmission.

As further shown in FIGURE 1, housing portion 33 is provided with a trough 51 adapted to collect oil, there being a pipe 52 connecting trough 51 to trough 47 on pump 38.

In FIGURE 2 there is shown the centrifugal pump assembly with a clutch release fork indicated generally at 53 and mounted upon the pump housing. As shown, a clutch actuating shaft 54, which may be supported for rotation in housing portion 33 of FIGURE 1, is provided with a pair of upstanding tines 55 forming a shift fork formed integrally with shaft 54. Each tine 55 is provided with an ear 56 adjacent the outer end of the tine and positioned to overlie one of the upstanding arms 57 of the clutch release fork plate 45. It will readily be understood that rotation of shaft 54 will cause axial motion of pump housing 38, and thrust bearing 30 to rotate Belleville spring 24 about studs 27. Ears 56 bear on arms 57 of clutch release fork plate 45 to prevent wear on housing 38 when the shaft 54 is actuated.

In FIGURE 3, the inner wall 58 of trough 47 is drilled at 59 to permit oil to flow from trough 47 to the base of impeller 40. Trough 47 extends radially outwardly beyond the outer diameter of impeller 40 in order to maintain a positive prime for the centrifugal pump. Bearing 30 is lubricated by oil admitted to the pump from trough 47.

As shown in FIGURE 1, impeller 40 delivers oil under pressure to a passage 60 connected to a passage 61 in pump housing 38. Drilled openings 62 and 63 in shaft 50 receive oil under pressure from passage 61 through opening 37 in axially extending pump support sleeve 34. Passage 63 may deliver oil under pressure to a transmission (not shown) driven by shaft 50 for lubrication or other purposes.

In operation of the FIGURE 1 embodiment, it will be understood that oil in clutch housing 10—33 will be thrown radially outwardly upon rotation of flywheel 12 and due to the centrifugal force applied thereto will travel radially inwardly along the inner surface of housing section 33 such that collector trough 51 will be supplied with oil. Oil collected by housing trough 51 is delivered to pump trough 47 by pipe 52 to supply oil to the pump. The pipe 52 is arranged to deliver oil to trough 47 irrespective of the position of the pump housing 38 in its path of travel. Oil delivered to passage 63 may be returned to the pump chamber through suitable passages (not shown) after it has performed its useful function.

It will be understood that Belleville spring 24 normally positions pressure plate 21 to engage clutch plate 22. Rotation of shaft 54 causes pump housing 38 and bearing 30 to move to the left to cause pivotal rotation of spring 24 about studs 27, thereby releasing the clutch. Spring 24 is continuously rotated by flywheel 12 and continuously drives impeller 40 irrespective of the position of the pump in its path of travel, and irrespective of the condition of engagement or release of the clutch.

As shown in FIGURE 4, impeller 40 may be formed of a very inexpensive sheet metal stamping, being shaped to have a base 64 adapted to fit upon outer race 31 of bearing 30, a drive ear or lug 41, and a plurality of impeller vanes 65 all formed as a unit. The pump is particularly well adapted for large scale manufacture for installations wherein relatively low pump pressure is required, such as, for example, lubrication pressure. The pump per se is extremely economical to manufacture and the drive of the pump by spring 24 utilizes already existing rotating facilities thereby further reducing cost.

In FIGURE 5, there is shown an alternate form of transmission incorporating a gear type pump rather than a vane pump. The pump of FIGURE 5 is particularly adapted for transmission control purposes wherein relatively high fluid pressures are required as well as lubrication purposes and represents a very economical form of positive displacement pump from the standpoint of cost.

Referring to FIGURE 5, the transmission unit is adapted to provide a main engine clutch and a two-speed drive train between an engine and a conventional multi-speed transmission. The unit is positioned in a clutch housing 70. A flywheel 72 is bolted to an engine driven shaft 71 by means of bolts 73. The flywheel is provided with a flat surface 74 which constitutes the fixed driving plate for the clutch 75. A support 76 is secured to flywheel 72 by studs 77. A clutch driving plate 78 is axially movable on flywheel 72, and a clutch pressure plate 79 is also supported upon flywheel 72 for axial motion. Drive plate 78 is provided with radially extending ears 80 and pressure plate 79 has ears 81, the ears 80 and 81 each fitting into axially extending slots 82 on flywheel 72. A pair of clutch driven plates 83 and 84 are connected by suitable spline connections 85 to an annular drum 86 which is carried by a planetary gear carrier 87. Sleeve shafts 88 supported in carrier 87 carry planetary pinion gears 89 which mesh with a ring gear 90 and a sun gear 91. A support member 92 splined to a power delivery shaft 93 connects ring gear 90 to shaft 93 for rotation therewith. A bushing 94 is positioned between the hub of support member 92 and flywheel 72 to rotatably support the shaft 93. Planet carrier 87 extends inwardly to shaft 93 between the ring gear support 92 and planet pinion 89. Carrier 87 supports a pair of thrust washers 95 and 96. A thrust washer 95 is disposed between the rear face 97 of the ring gear support 92 and the carrier 87 and washer 97 is placed between carrier 87 and the end of sun gear 91. Carrier 87 has oil passages 98 extending into sleeve shaft 88 to connect with pasages 99 in sleeve shaft 88 to lubricate the planetary pinion bearings.

Pressure plate 79 and clutch plate 78 are actuated by an annular Belleville spring 100 which is provided with apertures 101 fitting over studs 102 mounted on support member 76. Spring 100 is pivoted about a wire ring 103. The outer annular portion of spring 100 contacts a boss 104 on pressure plate 79 and the inner annular edge of spring 100 contacts the outer race 105 of a ball thrust or throw out bearing 106. The inner race 107 of bearing 106 is carried by an axially movable sleeve 108. A pump drive gear 109 is supported upon bearing race 107 for axial motion with sleeve 108. Spring 100 has an axially extending lug 110 cooperating with gear 109 to positively rotate the gear. A gear type pump 111 is supported upon and axially movable with sleeve 108. Pump 111 is composed of a drive gear 112 meshing with a driven gear 113, the gear 112 being fixed to a drive shaft 115 driven by means of a drive gear 114 in mesh with gear 109. A pump housing 116 carries a removable pump cover 117 secured to the housing by a series of screws 118 as shown in FIGURE 6. As further shown in FIGURE 6, the base of pump housing 116 is secured to sleeve 108 by means of bolts 119. A flexible passage 120 extends into the sump or bottom of housing 70 of FIGURE 6 and a flexible passage 121 constitutes the pressure delivery passage of the pump. As shown in FIGURE 5, gear 113 is supported upon an idler shaft 122. Shafts 115 and 122 are supported in housing 116 by means of sets of needle bearings 123—124 and 125—126, respectively. It is to be noted that due to the fact that the pump is located within the housing 70, no oil seals are required and that any limited leakage of oil through the needle bearings merely drains back to the sump. Bearing 106 is held upon sleeve 108 by means of a boss 127 and a snap ring 128. A clutch fork release plate 129 is secured to sleeve 108 at the opposite side of boss 127 from bearing 106. A clutch release shaft (not shown) may be pivoted in housing 70 for rotation and may carry a clutch release fork (not shown) adapted to cooperate with plate 129 to move the sleeve 108 axially to release the clutch 75 upon rotation of the clutch release shaft.

As further shown in FIGURE 5, a hollow sleeve 132 fixed to sun gear 91 and extending through sleeve 108 between sleeve 108 and shaft 93 carries a clutch drum 133 having a series of clutch disks 134 supported thereon for axial motion and driven by drum 133. A clutch hub 135 splined to shaft 93 carries axially movable clutch disks 136 on an annular axially extending drum 137. The disks 136 may be move axially on drum portion 137, but are not rotatable with respect to drum 137. A clutch backing member 138 is fixed to drum 137 and a radially extending flange 139 is fixed to hub 135. A piston 141 is disposed in a chamber 140 between drum 137, hub 135 and flange 139, the piston having an extension 142 extending outwardly between flange 139 and the inner surface of drum 137 and radially outwardly so as to be operative upon the stacked assembly of clutch disks. Oil under pressure may be admitted to a chamber 143 between flange 139 and piston 141 to engage the clutch plates 134—136 when desired. Oil may be admitted to chamber 143 by way of a passage 144 in housing 70 and passages 145, 146 and 147 in hub 135.

Extending radially outwardly from clutch drum 133 are a series of brake disks 150, the disks 150 being axially movable upon drum 133 and supported for rotation with the drum. A brake cylinder 151 fixed to housing 70 carries a pair of brake disks 152, the disks 152 being non-rotatable and supported for axial motion in cylinder 151. A piston 153 is supported for axial motion upon cylinder 151 and is pinned by a pin 154 to cylinder 151 so as to be fixed against rotation. A Belleville spring 156 seated upon a spring seat 157 bolted to cylinder 151 normally biases the piston 155 to engage the brake disks 150—152 thereby preventing rotation of sleeve 132 and sun gear 91. A chamber 158 may receive oil under pressure to release the brake disks 150—152, by way of a passage 159.

Oil under pressure may be simultaneously supplied to chambers 143 and 158 or exhausted from both chambers as desired under control of suitable valving, not shown. In normal operation, when starting the vehicle oil will initially be supplied to both chambers 143 and 148 to release the brake and apply the clutch. In this event, ring gear 90 and sun gear 91 are both fixed to shaft 93 to provide direct drive through the planetary gearing. After the vehicle is up to speed, oil may be dumped from chambers 143 and 148 to release clutch 134—136 and permit Belleville spring 156 to engage brake disks 150—152. In this condition of operation, sun gear 91 is held against rotation to provide overdrive through the planetary gearing. This results in slowing up the speed of engine shaft 71 with respect to that of shaft 93 with consequent savings in fuel consumption. Further savings in fuel consumption result from the fact that no control pressure need be maintained in chambers 143 and 158 when operating in overdrive, the brake being engaged by means of spring 156.

Shaft 93 is supported in casing 70 at its rear end by means of a ball bearing 160 and is drilled at 161, 162 and 163 to admit oil for lubrication purposes. A passage 165 in clutch hub 135 communicates with passage 162 to admit lubricating oil to a passage 166 in piston 141. Clutch drum 137 is drilled at 167 to admit oil from passage 166 to clutch plates 136. Passage 163 admits oil from passage 161 to passage 98 in planet carrier 87.

It will be understood that drive gear 109 of pump 111 will be continuously driven by Belleville spring 100 irrespective of the axial position of sleeve 108 and pump 111 in their path of travel. The flexible pipes 120 and 121 permit axial motion of the pump without interference to its performance. By positioning pump 111 inside the clutch housing, an inexpensive type pump may be used. The need for close manufacturing tolerances and oil seals is obviated since oil leakage through bearings 124, 125, 126, 127 merely drains back to the sump. In the embodiment in FIGURE 5, pump 111 is continuously driven by clutch actuating spring 100 irrespective of engagement or release of the clutch.

In FIGURE 7 there is shown a modified form of the invention wherein the pump is fixed to the transmission case but is driven by the clutch actuating spring irrespective of the condition of engagement or release of the clutch. The two speed planetary gearing unit is adapted to provide either underdrive or direct drive. A clutch housing 170 encloses a flywheel 172 driven by an engine driven shaft 171. An annular ring 174 bolted to flywheel 172 by means of a series of bolts 175 constitutes a reaction member for a Belleville spring 176 and retains the Belleville spring on the flywheel. A pressure plate 177 has upstanding ears 178 cooperating with a series of flat sided slots 179 on flywheel 172 such that pressure plate 177 is axially movable upon but rotatable with flywheel 172. A flat surface 180 on flywheel 172 constitutes a drive clutch surface of the flywheel.

A driven clutch plate 181 is bolted to a ring gear 183 of a planetary gearing unit by means of a series of bolts 182. A planet carrier 184 splined to a power delivery shaft 220 supports a plurality of pinion gears 186 on a series of stud shafts 185, the planet gears being in mesh with ring gear 183 and a sun gear 187, a sleeve shaft extension 188 of sun gear 187 carries a drum member 189. A series of clutch disks 190 are supported upon drum 189, the disks 190 being axially movable with respect to and fixed to drum 189 for rotation with the drum. A clutch hub 191 splined to power delivery shaft 220 carries a series of clutch disks 192, the disks 192 being axially movable with respect to and rotatable with clutch hub 191. A brake member 193 fixed to housing 170 by means of bolts 194 carries a series of brake disks 195, the disks 195 being axially movable upon member 193 and fixed against rotation. A series of brake disks 196, a pressure plate 197 and a pressure plate 198 are supported for axial motion on drum 189. A piston 199 in a chamber 200 in brake member 193 is provided with an extension 201 extending outwardly from chamber 200, the extension 200 being supported upon the base of clutch hub 191 and carrying a backing member 202 for a Belleville spring 203. The outer edge of annular spring 203 is retained between a pair of snap rings 204. Passages 205 and 206 in member 193 permit the introduction of fluid pressure to and exhaust of pressure from chamber 200 for drive ratio control purposes as hereafter more fully explained. A passage 207 and ports 208 and 209 constitute oil discharge passages for lubricating oil supplied to the clutch and brake disks as hereafter more fully explained.

An axially movable sleeve member 210 supported upon sleeve shaft 188 by means of a bearing 211 is flanged at 212 to receive the inner edge of Belleville spring 176, the member 210 being fixed to spring 176 for rotation with the spring by means of a drive lug 213. Sleeve 210 has formed integrally therewith a drive gear 214 which meshes with gear 215 fixed to a pump drive shaft 216. Pump 217 is a gear pump of the type shown in FIGURE 5, but is mounted upon housing 170.

A clutch throw out bearing 218 is supported upon member 210, the outer race 219 being acted upon by a manually operable clutch throw out fork 219A.

In operation, Belleville spring 176 will normally pivot about ring 174 to engage pressure plate 178 to clutch plate 181. Rotation of fork 220 by conventional linkage mechanism, not shown, will move bearing 218 and sleeve 210 to the right to move the inner edge of Belleville spring 176 to release the spring from pressure plate 178 to release the clutch. Spring 176 is continuously rotated by flywheel 172 irrespective of the condition of engagement or release of the main clutch. Gear 214 slides axially upon gear 215 to provide continuous drive of pump 217 through spring 176 irrespective of the axial position of member 210. Pump 217 may draw oil from the sump or lower portion of housing 170 through a suction conduit similar to conduit 120 of FIGURE 7 and deliver oil to a control valve mechanism, not shown, through a conduit similar to passage 121 of FIGURE 6. The conduits (not shown) may be rigid rather than flexible.

Fluid under pressure may be admitted to chamber 200 or exhausted from chamber 200 under control of suitable valving, not shown, through passages 205 and 206. In starting up the vehicle, oil will normally initially be supplied to chamber 200 to engage brake disks 195—196. Sun gear 187 will thereby be held against rotation to provide torque multiplication or underdrive through the gear unit. After the vehicle is brought up to speed, passage 205 is connected to exhaust to permit Belleville spring 203 to engage clutch disks 190—192. Sun gear 187 and carrier 184 are thereupon both fixed to power delivery shaft 220 for direct drive through the planetary gear unit. No hydraulic pressure is required to maintain direct drive operation, so that power consumption of the pump is reduced.

Power delivery shaft 220 is supported at its rear by means of a ball bearing 223. A central passage 224 through shaft 220 may be supplied with oil for lubrication purposes. Passages 221 and 222 communicate with passage 224 to admit oil to the clutch and brake for lubrication and cooling. Ports 209, 208 and passage 207 admit oil to passage 224 and to the clutch and brake disks for lubrication and cooling. Shaft 220 may constitute the power input shaft for a conventional manually shiftable gear box or an automatic transmission.

In all three modifications the pump is continuously driven by the main clutch Belleville spring irrespective of engagement or release of the clutch. In all three modifications a very inexpensive type of pump is utilized. The gear pump requires no oil seals and the centrifugal pump is formed of a simple inexpensive sheet metal stamping. In the preferred embodiments of FIGURES 1 and 5 the pump moves axially with axial motion of clutch throw out bearing. In the FIGURE 7 modification, one drive gear moves axially with respect to the other pump drive gear to maintain constant pump drive during actuation of the main clutch. All three pumps are positioned in the clutch chamber of the main engine clutch so that no oil seals are required and any oil leakage from the pumps merely drains to the clutch sump. This makes possible the use of the inexpensive types of pumps illustrated. All three arrangements use the Belleville spring used for clutch control as a pump drive member, thereby further reducing costs.

We claim:

1. In a transmission of the type having a clutch housing and having an engageable and releasable clutch disposed in said housing located between a power input shaft and a power delivery shaft and having a clutch control member adapted to be actuated to control the engagement and release of said clutch, the improvement which comprises a hydraulic pump adapted to deliver hydraulic fluid under pressure, said pump including a pump housing disposed within said clutch housing and having rotatable pumping means disposed within said pump housing, and a drive connection between said rotatable pumping means and said clutch control member, said clutch control member being effective to drive said rotatable pumping means irrespective of the condition of engagement or release of said clutch.

2. In a transmission of the type having a power input shaft and a power delivery shaft and having an engageable and releasable clutch positioned in a clutch housing for operatively connecting and disconnecting said shafts to and from each other, and having means including rotatable clutch control means for controlling the engagement and release of said clutch, the improvement which comprises a hydraulic pump positioned in said clutch housing, said pump including a pump housing disposed within said clutch housing, rotatable pumping means disposed within said pump housing, and a drive connection between said clutch control means and said rotatable pumping means for continuously driving said rotatable pumping means in response to rotation of said clutch control means.

3. In a transmission of the type having a power input shaft and a power delivery shaft and having an engageable and releasable clutch positioned within a clutch housing for selectively connecting and disconnecting said shafts to and from each other, clutch actuating mechanism including a rotatable Belleville spring, and a pump including a pump housing disposed within said clutch housing and including rotatable pumping means disposed within said pump housing, and means forming a drive connection between said rotatable pumping means and said Belleville spring for continuously driving said rotatable pumping means in response to rotation of said Belleville spring irrespective of the condition of engagement or release of said clutch.

4. In a transmission of the type having a power input shaft and a power output adapted to be operatively connected and disconnected by means of an engageable and releasable clutch disposed in a clutch housing, means for controlling the engagement and release of said clutch disposed in said clutch housing including an axially movable member and an additional member adapted to be controlled by said axially movable member, a pump, said pump including a pump housing disposed within said clutch housing and pumping means within said pump housing, and means operatively connecting said pumping means to said additional member for continuously driving said pumping means irrespective of the position of said actually movable member in its path of travel.

5. In a transmission of the type having a power input shaft and a power delivery shaft adapted to be operatively connected and disconnected by means of a clutch disposed in a clutch housing and having means including a Belleville spring and a clutch throw out bearing operative upon said Belleville spring for controlling the engagement and release of said clutch, a pump continuously driven by said Belleville spring, said pump and said throw out bearing being axially movable as a unit to control the engagement and release of said clutch.

6. In a transmission of the type having a power input shaft and a power delivery shaft adapted to be operatively connected and disconnected by means of a clutch disposed in a clutch housing, a support member for supporting a pump and a clutch throw out bearing in said housing, said power delivery shaft extending through said support member, a Belleville spring operatively associated with said clutch and said throw out bearing, a drive connection between said Belleville spring and said pump, said throw out bearing being movable to control the engagement and release of said clutch, said pump being movable as a unit with said throw out bearing and said Belleville spring being effective to drive said pump irrespective of the position of said throw out bearing in its path of travel.

7. In a transmission of the type having a power input shaft and a power delivery shaft adapted to be operatively connected and disconnected by means of a clutch disposed in a clutch housing, a support member in said housing, a pump having a housing supported for axial motion on said support member, a clutch throw out bearing carried by said pump housing, a Belleville spring between said clutch and said throw out bearing, said pump housing and said clutch throw out bearing being movable as a unit to control the engagement and release of said clutch, and a drive connection between said Belleville spring and said pump for driving said pump irrespective of the engagement or release of said clutch.

8. In a transmission of the type having a power input shaft and a power delivery shaft adapted to be connected and disconnected by means of a clutch disposed in a clutch housing, an axially movable sleeve through which said power delivery shaft extends, a pump and a clutch throw out bearing carried by said sleeve, a Belleville spring operatively connecting said throw out bearing to said clutch, and a drive connection between said Belleville spring and said pump for driving said pump irrespective of the position of said axially movable sleeve in its path of travel.

9. In a transmission of the type having a clutch flywheel driven by a power input shaft and a power delivery shaft adapted to be connected to and disconnected from said flywheel by means of a clutch disposed in a clutch housing containing oil, a Belleville spring and a clutch throw out bearing movable to control the engagement and release of said clutch, a pump driven by said Belleville spring, an oil collecting trough on the inside surface of said clutch housing for collecting oil thrown outwardly by rotation of said flywheel, and means for conducting oil from said trough to said pump.

10. In a transmission of the type having a power input shaft and a power delivery shaft adapted to be connected and disconnected by means of a clutch disposed in a clutch housing, an axially movable sleeve member through which said power delivery shaft extends, a clutch throw out bearing movable to move said sleeve, a Belleville spring driven by said power input shaft and operatively connecting said clutch to said sleeve, said sleeve being driven by said Belleville spring, a pump, means forming a drive connection between said sleeve and said pump, said Belleville spring being effective to drive said sleeve and said pump irrespective of the position of said throw out bearing in its path of travel.

11. In a transmission of the type having a power input shaft, a power delivery shaft, a clutch housing, a flywheel driven by said power input shaft, a clutch member rotatable with said power delivery shaft, a pressure plate carried by said flywheel and adapted to engage and to be released from said clutch member, a Belleville spring carried by said flywheel for controlling the engagement and release of said pressure plate to and from said clutch member, a bearing contacting said Belleville spring and movable to actuate said Belleville spring, a pump housing disposed within said clutch housing and fixed against rotation, and rotatable means within said pump housing and continuously driven by said Belleville spring irrespective of the position of said bearing in its path of travel.

12. In a transmission of the type having a power input shaft, a power delivery shaft, a clutch housing, a flywheel driven by said power input shaft, a driven clutch member rotatable with said power delivery shaft, a pressure plate carried by said flywheel and adapted to engage and to be released from said driven clutch member, a Belleville spring carried by said flywheel for controlling the engagement and release of said pressure plate to and from said clutch member, a clutch throw out bearing axially movable with respect to said power delivery shaft for controlling said Belleville spring, a pump casing disposed within said clutch housing fixed against rotation, and rotatable pumping means within said casing, said rotatable pumping means being continuously rotated by said Belleville spring irrespective of the position of said clutch throw out bearing in its path of travel.

References Cited in the file of this patent

UNITED STATES PATENTS

| | | |
|---|---|---|
| 1,493,319 | Brodie | May 6, 1924 |
| 2,107,954 | Morton et al. | Feb. 8, 1938 |
| 2,117,482 | Klix | May 17, 1938 |